(12) United States Patent
Hung et al.

(10) Patent No.: US 8,394,870 B2
(45) Date of Patent: *Mar. 12, 2013

(54) CROSSLINKED FLUOROPOLYMER NETWORKS

(75) Inventors: Ming-Hong Hung, Wilmington, DE (US); Bruno Ameduri, Montpellier (FR); Georgi Kostov, Burgas (BG)

(73) Assignees: E.I. du Pont de Nemours and Company, Wilmington, DE (US); Le Centre National de la Recherche Science (FR)

( * ) Notice: Subject to any disclaimer, the term of this patent is extended or adjusted under 35 U.S.C. 154(b) by 636 days.

This patent is subject to a terminal disclaimer.

(21) Appl. No.: 12/504,320

(22) Filed: Jul. 16, 2009

(65) Prior Publication Data

US 2011/0015359 A1   Jan. 20, 2011

(51) Int. Cl.
*C08F 16/24* (2006.01)

(52) U.S. Cl. ........ 522/130; 522/156; 522/187; 526/242; 526/247; 526/254; 526/255

(58) Field of Classification Search ............ 526/247, 526/253, 255; 522/130, 156, 187
See application file for complete search history.

(56) References Cited

U.S. PATENT DOCUMENTS

| | | | |
|---|---|---|---|
| 6,929,899 B2 * | 8/2005 | Pottebaum et al. | 430/285.1 |
| 2008/0081195 A1 * | 4/2008 | Chung et al. | 428/421 |
| 2008/0139773 A1 * | 6/2008 | Bekiarian | 526/321 |
| 2009/0036706 A1 | 2/2009 | Murata et al. | |
| 2009/0105435 A1 | 4/2009 | Hung et al. | |

FOREIGN PATENT DOCUMENTS

FR   2810668 A1 * 12/2001

OTHER PUBLICATIONS

Drobny, J., Technology of Fluoropolymers, 2001, CRC Press LLC, p. 88.*

* cited by examiner

*Primary Examiner* — Nicole M Buie-Hatcher

(57) ABSTRACT

Disclosed herein is a crosslinked fluoropolymer network formed by the free radical initiated crosslinking of a diacrylate fluoropolymer The diacrylate copolymer is of formula $CH_2=CR'COO-(CH_2)_n-R-(CH_2)_n-OOCR'=CH_2$, wherein R is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin, R' is H or $-CH_3$, n is 1-4 and wherein said oligomer has a number average molecular weight of 1000 to 25,000 daltons. The source of the free radicals may be a photoinitiator or an organic peroxide.

5 Claims, No Drawings

CROSSLINKED FLUOROPOLYMER NETWORKS

FIELD OF THE INVENTION

This invention relates to crosslinked fluoropolymer networks formed by the free radical initiated reaction of fluoropolymers having acrylate groups at both ends of main polymer chains.

BACKGROUND OF THE INVENTION

Elastomeric fluoropolymers (i.e. fluoroelastomers) exhibit excellent resistance to the effects of heat, weather, oil, solvents and chemicals. Such materials are commercially available and are most commonly either copolymers of vinylidene fluoride ($VF_2$) with hexafluoropropylene (HFP) or copolymers of $VF_2$, HFP, and tetrafluoroethylene (TFE).

Other common fluoroelastomers include the copolymers of TFE with one or more hydrocarbon olefins such as ethylene (E) or propylene (P), and also the copolymers of TFE with a perfluoro(alkyl vinyl ether) such as perfluoro(methyl vinyl ether) (PMVE).

Many fluoroelastomers require incorporation of a cure site monomer into their polymer chains in order to crosslink efficiently (Logothetis, A. L., Prog. Polym. Sci., Vol. 14, pp 251-296 (1989); A. Taguet et al. Advances in Polymer Science, Vol. 184, pp 127-211 (2005)). Without such a cure site monomer, the fluoroelastomer may not react at all with curing agents, it may only partially react, or reaction may be too slow for use on a commercial scale. Seals made from poorly crosslinked elastomers often fail sooner than might otherwise be expected. Unfortunately, disadvantages are associated with many of the cure site monomers and curatives in use today. For example, some curatives (e.g. diamines) are toxic. Cure site monomers which contain reactive bromine or iodine atoms can release byproducts during the curing reaction that are harmful to the environment. Other cure site monomers (e.g. those which contain double bonds at both ends of the molecule) may be so reactive that they disrupt polymerization of the fluoroelastomer by altering the polymerization rate, terminating polymerization, or by causing undesirable chain branching, or even gelation to occur. Lastly, incorporation of a cure site monomer into a fluoroelastomer polymer chain may negatively impact the properties of the fluoroelastomer (both physical properties and chemical resistance).

There exists a need in the art for new fluoroelastomer cure systems which are environmentally friendly, do not disrupt polymerization and which do not detract from the properties of the fluoroelastomer.

Telechelic difunctional low molecular weight (number average molecular weight between 1000 and 25,000 daltons) copolymers of vinylidene fluoride ($VF_2$) with perfluoro(methyl vinyl ether) (PMVE) and difunctional copolymers of tetrafluoroethylene (TFE) with PMVE have been disclosed in US 20090105435 A1. A functional group is located at each end of the copolymer main chain. Functional groups disclosed include iodine, allyl, hydroxyl, carboxyl and nitrile.

SUMMARY OF THE INVENTION

The present invention is a crosslinked fluoropolymer network formed by the free radical initiated reaction of a fluoropolymer having an acrylate group on each end of its main polymer chain.

Accordingly an aspect of the present invention is a process for the manufacture of a crosslinked fluoropolymer network, said process comprising:

A) providing a telechelic diacrylate copolymer of formula $CH_2=CR'COO-(CH_2)_n-R-(CH_2)_n-OOCCR'=CH_2$, wherein R' is H or $-CH_3$, n is 1-4 and R is an oligomer having a number average molecular weight of 1000 to 25,000 daltons, said oligomer selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin;

B) mixing said diacrylate copolymer with a source of free radicals selected from the group consisting of photoinitiators and organic peroxides to form a curable composition; and C) generating free radicals to form a crosslinked fluoropolymer network.

Another aspect of the invention is a crosslinked fluoropolymer network made by the process comprising:

A) providing a diacrylate copolymer of formula $CH_2=CR'COO-(CH_2)_n-R-(CH_2)_n-OOCCR'=CH_2$, wherein R' is H or $-CH_3$, n is 1-4 and R is an oligomer having a number average molecular weight of 1000 to 25,000 daltons, said oligomer selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin;

B) mixing said diacrylate copolymer with a source of free radicals selected from the group consisting of photoinitiators and organic peroxides to form a curable composition; and C) generating free radicals to form a crosslinked fluoropolymer network.

DETAILED DESCRIPTION OF THE INVENTION

The present invention is directed to crosslinked fluoropolymer networks and to a process for the manufacture of said networks.

Fluoropolymers employed to make the crosslinked networks of the invention have an acrylate or methacrylate group at each end of polymer main chains. By "main chain" is meant the longest chain of copolymerized monomer units, i.e. not side chains or branches.

The telechelic diacrylate fluoropolymers employed in this invention have the formula $CH_2=CR'COO-(CH_2)_n-R-(CH_2)_n-OOCCR'=CH_2$, wherein R' is H or $-CH_3$, n is 1-4 (preferably 2 or 3) and R is an oligomer having a number average molecular weight of 1000 to 25,000 daltons, preferably 1200 to 12,000 daltons, most preferably 1500 to 5000 daltons. Oligomer, R, is selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin. Hydrocarbon olefins include ethylene (E) and propylene (P). Optionally, oligomer, R, may further comprise at least one additional comonomer, different from the other two comonomers. Examples of such additional comonomers include, but are not limited to vinylidene fluoride ($VF_2$), hexafluoropropylene (HFP), tetrafluoroethylene (TFE) and perfluoro(methyl vinyl ether) (PMVE).

Specific examples of oligomers that may be employed in the fluoropolymers (and the diols used to make them) include, but are not limited to TFE/PMVE, $VF_2$/PMVE, $VF_2$/TFE/PMVE, TFE/PMVE/E, $VF_2$/HFP, $VF_2$/HFP/TFE, TFE/P and TFE/P/$VF_2$.

The telechelic diacrylate fluoropolymers employed in this invention may be made by a process comprising A) providing a diol of formula HO—$(CH_2)_n$—R—$(CH_2)_n$—OH, wherein n and R are defined above; and B) reacting said diol with an acryloyl halide or methacryloyl halide (e.g. acryloyl chloride or methacryloyl chloride) to form a diacrylate copolymer of formula 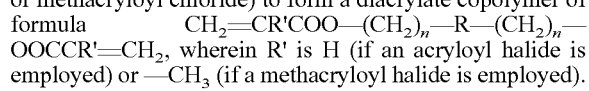 $CH_2$=CR'COO—$(CH_2)_n$—R—$(CH_2)_n$—OOCCR'=$CH_2$, wherein R' is H (if an acryloyl halide is employed) or —$CH_3$ (if a methacryloyl halide is employed).

Diols of formula HO—$(CH_2)_n$—R—$(CH_2)_n$—OH may be made from a multi-step process beginning with the corresponding α,ω-diiodo oligomers of formula I—R—I prepared generally as described in U.S. 20090105435 A1.

The telechelic diiodo oligomers may be ethylenated (or allylated) by reaction, in the presence of a radical initiator, with ethylene (or allyl alcohol, followed by the selective reduction of the iodine atoms). The resulting oligomers may then be hydrolyzed to form the diols.

The crosslinked fluoropolymer networks of this invention are made by exposing the diacrylate fluoropolymer to a source of free radicals in order to initiate a radical crosslinking reaction through the terminal acrylate groups on the fluoropolymer. The source of the free radicals may be a UV light sensitive radical initiator (i.e. a photoinitiator or UV initiator) or the thermal decomposition of an organic peroxide. Suitable photoinitiators and organic peroxides are well known in the fluoroelastomers art.

Specific examples of photoinitiators include, but are not limited to Darocur® photoinitiator 1173, Irgacure® curative 819 and Irgacure® curative 907 (available from Ciba Specialty Chemicals).

A specific example of an organic peroxide includes, but is not limited to t-butylperoxypivalate.

Optionally, a composition containing diacrylate fluoropolymer and free radical source may be shaped prior to generating free radicals.

Compositions containing the diacrylate fluoropolymer and free radical source may be made by combining the fluoropolymer and radical source in conventional rubber industry mixers such as 2-roll mills and internal mixers. Optionally other ingredients such as fillers (e.g. carbon black, mineral fillers, fluoropolymer micropowders, etc.), colorants, process aids, etc. commonly employed in the rubber industry may be included in the compositions.

Crosslinking takes place by exposing the fluoropolymer composition to UV radiation (if a photoinitiator is employed) or to sufficient heat to decompose the peroxide (if an organic peroxide is employed). Optionally, the fluoropolymer composition may contain both a photoinitiator and an organic peroxide, so that both UV radiation and heat are employed to crosslink the fluoropolymer.

The crosslinked fluoropolymer networks of this invention are useful as durable coatings and films having good flexibility, chemical resistance and thermal properties.

EXAMPLES

Test Methods

Number average molecular weight (Mn) of non-crosslinked telechelic fluoropolymers was determined by size exclusion chromatography (SEC). Samples were dissolved in THF. Analyses were performed with a Spectra-Physics chromatograph equipped with two PLgel 5 µm Mixed-C columns from Polymer Laboratories and a Spectra Physics SP8430 Refractive Index (RI) and UV detector. Tetrahydrofuran (THF) was used as eluent, with a flow rate of 0.8 mL min$^{-1}$. Standards were monodispersed poly(styrene) (PS) or poly(methylmethacrylate), purchased from Polymer Laboratories or other vendors.

Fluoropolymer and oligomer compositions and microstructures were determined by $^{19}F$ and $^1H$ NMR spectroscopy. NMR spectra were recorded on a Bruker AC 400 (400 MHz) instrument, using deuterated acetone as solvent and tetramethylsilane (TMS) (or $CFCl_3$) as the references for $^1H$ (or $^{19}F$) nuclei. Coupling constants and chemical shifts are given in Hz and ppm, respectively. The experimental conditions for $^1H$ (or $^{19}F$) NMR spectra were the following: flip angle 90° (or 30°), acquisition time 4.5 s (or 0.7 s), pulse delay 2 s (or 5 s), number of scans 16 (or 64), and a pulse width of 5 µs for $^{19}F$ NMR.

The telechelic diacrylate fluoropolymers employed in the examples were made by the following procedures.

FP1, $CH_2$=CHCOO—$(CH_2)_2$—R—$(CH_2)_2$—OOCCH=$CH_2$, wherein R is poly(vinylidene fluoride-co-perfluoro(methyl vinyl ether) [i.e. poly($VF_2$-co-PMVE)].

The diol oligomer employed in the fluoropolymer manufacturing process was made from a multi-step process, beginning with a telechelic diiodo oligomer of formula I-($VF_2$-co-PMVE)-I. The latter was made by the process disclosed in U.S. 20090105435 A1. This diiodo oligomer contained 71.5 mol % $VF_2$ and 28.5 mol % PMVE and had a number average molecular weight of 2500 daltons.

Ethylenation of the Diiodo Oligomer:

A 160 mL Hastelloy (HC-276) autoclave, equipped with inlet and outlet valves, a manometer and a rupture disc, was degassed and pressurized with 30 bar of nitrogen to check for leaks. Then, a 0.5 mm Hg vacuum was operated for 5 minutes (min.) and subsequently an argon atmosphere was applied. Such a procedure of autoclave degassing was repeated five times. Under vacuum, 5.0 g (2.87×10$^{-2}$ mole) of t-butylperoxypivalate (TBPPi), 50 mL of t-butanol and 100.0 g (0.077 mole) of the above-described telechelic diiodo oligomer were transferred into the autoclave. 6.0 g of ethylene (0.214 mole) was introduced into the autoclave. Then, the autoclave was progressively heated to 75° C. An exotherm was observed of about 10° C. and an increase of pressure from 15 bars up to 18 bars, followed by a drop of pressure to 14 bars over 16 hours. After reaction, the autoclave was placed in an ice bath for about 60 minutes and 0.5 g of unreacted ethylene was slowly released. After opening the autoclave, the reaction mixture was dissolved in 100 ml of butanone and washed with distilled water (2×100 ml), $Na_2S_2O_5$ solution (100 ml) and brine (100 ml) respectively in a separating funnel. Then, the organic phase was dried over $MgSO_4$ and filtered through sintered glass (G4). The organic solvent was removed by a rotary vacuum evaporator at 40° C., reducing pressure to 10 mm Hg. The resulting slightly yellow viscous liquid was dried at 40° C. under 0.01 mbar vacuum to constant weight. The yield of the reaction was 91%. The product was analyzed by $^1H$ NMR and $^{19}F$ NMR spectroscopy. An absence of the signal corresponding to the terminal —$CF_2I$ (approximately −39 ppm) indicated quantitative conversion of the telechelic diiodopoly($VF_2$-co-PMVE) to ethylenated oligomer.

Hydrolysis of Ethylenated Copolymer:

To a 250 ml two-neck round-bottom flask equipped with a reflux condenser and magnetic stirrer was introduced 61.6 g (0.044 mole) of ethylenated product synthesized above and 80.4 g (1.1 moles) of DMF. Then, the mixture was purged with nitrogen for 20 min. and 4.0 g of water was added through a septum. The reaction was heated up to 120° C. and stirred overnight. After 14 hours, the crude product (reaction mixture) was cooled to room temperature and a mixture of $H_2SO_4$ (25 g) in methanol (70 g) was added dropwise. The reaction was kept at room temperature for 24 hrs. Then, the reaction mixture was washed with distilled water (3×100 ml) and ethyl acetate (200 ml) in a separating funnel. The organic phase was dried over $MgSO_4$ and filtered through sintered glass (G4). The ethyl acetate and traces of DMF were removed by a rotary vacuum evaporator (40° C./20 mm Hg). The resulting brown viscous liquid was dried at 40° C. and 0.01 mbar to constant weight. The product (yield 74 wt %) was analyzed by $^1H$ NMR, $^{19}F$ NMR spectroscopy.

Conversion to Acrylates:

A 250 ml two-neck round-bottom flask equipped with a reflux condenser and magnetic stirrer was charged with 25.0 g (19.2 mmoles) of diol synthesized above dissolved in 100 ml of THF (dried), and 12 g of poly(vinylpyridine). The reaction mixture was cooled to 0° C. under nitrogen atmosphere and 20 mg (0.18 mmoles) of hydroquinone were added. Acryloyl chloride was added by syringe through a septum in four subsequent doses (4 g, 4 g, 2 g, 4 g, respectively) in the interval of 6 hours (hrs). An additional 10 g of poly(vinylpyridine) was added to the reaction mixture. After addition of the first dose of acryloyl chloride, the reaction temperature was kept at 40° C. over a period of 48 hrs. Poly(vinylpyridine) was removed by filtration through sintered glass G4. Then a butanone/water (1/1) mixture was added and subsequently washed with water. The organic layer was dried over $MgSO_4$ and then filtered through sintered glass (G4). The solvents and excess acryloyl chloride were removed using a rotary vacuum evaporator (40° C./20 mm Hg). The resulting brown viscous liquid was dried at 40° C. under 0.01 mbar vacuum to constant weight. The product (yield 81%) was analyzed by $^1H$ and $^{19}F$ NMR.

FP2, $CH_2$=CHCOO—$(CH_2)_3$—R—$(CH_2)_3$—OOCH=$CH_2$, wherein R is poly(vinylidene fluoride-co-perfluoro(methyl vinyl ether) [i.e. poly($VF_2$-co-PMVE)copolymer].

Conversion to Telechelic Bis-Iodohydrin:

A 100 ml two-neck round-bottom flask equipped with a reflux condenser and a magnetic stirrer was charged with 10.5 g (6 mmoles) of the above-described telechelic I-($VF_2$-co-PMVE)-I, 2.05 g (34.4 mmoles) of allyl alcohol and 50 ml of $CH_3CN$. Then the flask was heated to 80° C. AlBN (2,2'azo-bisisobutyronitrile) was added in 10 doses (20 mg each) with the addition interval of 30 min. The reaction was conducted under nitrogen atmosphere at 80° C. for 21 hours. After cooling to room temperature (about 25° C.), the reaction mixture was filtered through cotton and then the solvent and excess allyl alcohol were removed on a rotary vacuum evaporator (40° C./20 mm Hg). The resulting slightly yellow viscous liquid was dried (40° C./0.01 mbar) to constant weight. The product (yield 93%) was analyzed by $^1H$ and $^{19}F$ NMR, and FT-IR spectroscopy.

Reduction of Fluorinated Telechelic Di-Iodohydrin to Bis (Propyl Alcohol):

A 250 ml three-neck round bottom flask equipped with a reflux condenser and a magnetic stirrer was charged with 11.5 g (6.6 mmoles) of the above-prepared telechelic bis-iodohydrin, 4.8 g (16.5 mmoles) of $Bu_3SnH$ and 50 ml of $CH_3CN$. Then the flask was heated to 70° C. AlBN (2,2'-azobisisobutyronitrile) was added in 10 doses (55 mg each) with an interval of 60 min. between additions. The reaction was conducted under nitrogen atmosphere at 70° C. for 12 hours. After cooling to room temperature, 0.6 g of KF was added together with 50 ml of $Et_2O$. Then the reaction was stirred at about 25° C. for 24 hours. The reaction mixture was filtered through sintered glass (G5) to remove white solid such as $Bu_3SnK$, $Bu_3SnF$ or $Bu_3SnI$. The solvents were removed on a rotary vacuum evaporator (40° C./20 mm Hg). The crude product was dissolved in 50 ml of butanone and washed with water (2×50 ml). The organic layer was dried over $MgSO_4$ which was then filtered through sintered glass (G4). The butanone was partly removed on a rotary vacuum evaporator and residue was precipitated from pentane. After cooling 12 hours at 4° C., pentane was carefully removed from the precipitated product by decantation. The residual solvent was removed by rotary vacuum evaporation (40° C./20 mm Hg). The resulting light yellow viscous liquid was dried (40° C./0.01 mbar) to constant weight. The product (overall yield 91%) was analyzed by $^1H$ and $^{19}F$ NMR and FT-IR spectroscopy. The decanted pentane was also evaporated to give a low molecular weight fraction of the desired polymer.

Acrylation of Diol:

A 100 ml three-neck round bottom flask equipped with a reflux condenser and a magnetic stirrer was charged with 5.03 g (3.33 mmoles) of the above-prepared telechelic bis(propyl alcohol)-poly($VF_2$-co-PMVE), 25 ml of THF, 4.5 g of poly (vinylpolypyrolidone), 5 mg (0.045 mmoles) of hydroquinone and cooled to 0° C. Then acryloyl chloride (4.456 g, 4 ml, 50 mmoles) was added dropwise in three doses (2 ml, 1 ml & 1 ml). After the first addition of acryloyl chloride, the reaction temperature was increased to 40° C.; the two subsequent additions were completed after elapsed times of 5 and 22 hours. An additional amount of poly(vinylpolypyrolidone) (4.5 g) was then added to the reaction mixture. The reaction was conducted under nitrogen atmosphere at 40° C. for 48 hours. After cooling to room temperature, the reaction mixture was filtered through sintered glass (G4) to remove poly (vinylpolypyrolidone). The filtered poly(vinylpolypyrolidone) was washed with THF. The solvent was partly removed by rotary evaporation and residue was precipitated in pentane. After 12 hours at 4° C., the pentane was carefully decanted, leaving the precipitated product. The residual solvent was removed by rotary evaporation (40° C./20 mm Hg). The resulting pale yellow viscous liquid was dried (40° C./0.01 mbar) to constant weight. The product (overall yield 91%) was analyzed by $^1H$ and $^{19}F$ NMR. The decanted pentane was also evaporated and returned a low yield (7%) of a low molecular weight fraction of desired polymer.

Example 1

The UV curing of diacrylated fluoropolymer FP1 to form crosslinked fluoropolymer networks was carried out using a "UV—system", available from Applied Curing Technology Ltd., UK. Conditions employed were Speed of conveyor 10 cm/min; UV lamps H and D; lamp distance from the conveyor=10 cm; λ=220-320 nm; parabolic beam, beam density ρ=240 W/cm$^2$; 1 pass=2.2 seconds (sec.).

Curable compositions containing FP1 and photoinitiator were made by mixing the diacrylated fluoropolymer and photoinitiator in bulk. Films of varying thickness were made for testing by casting the mixture of FP1 and photoinitiator to be tested onto aluminum pans. Formulations, film thickness, curing conditions and a visual estimate of the degree of crosslinking in the resulting films are shown in Table I. The terms "good", "fair", and "poor" refer to very well crosslinked, suitably crosslinked and poorly crosslinked, respectively. Non-crosslinked films are completely soluble in octane whereas highly crosslinked films are not. The degree of crosslinking in films treated with UV radiation was determined by estimating the solubility of treated films in octane at 25° C. after 16 hours stirring. Films that were completely soluble were designated as poor crosslinking, partially soluble films as fair crosslinking and insoluble films as good crosslinking in Table I.

toinitiator in bulk. Films of varying thickness were made for testing by casting the mixture of FP2 and photoinitiator to be tested onto aluminum pans. Formulations, film thickness, curing conditions and a visual estimate of the degree of crosslinking (same test as employed in Example 1) in the resulting films are shown in Table II. Also contained in Table

TABLE I

| Sample # | Photo-Initiator | Amount Photo-Initiator (wt. %[1]) | Film Thickness (mm) | UV Lamp | Number of Passes | Degree of Crosslinking |
|---|---|---|---|---|---|---|
| 1 | Darocur ® 1173 | 2 | 0.25 | H | 2 | Good |
| 2 | Darocur ® 1173 | 1 | 0.25 | H | 2 | Fair |
| 3 | Darocur ® 1173 | 3 | 0.25 | H | 2 | Good |
| 4 | Darocur ® 1173 | 3 | 0.75 | H | 2 | Poor |
| 5 | Darocur ® 1173 | 3 | 1.5 | H | 2 | Poor |
| 6 | Irgacure ® 819 | 2 | 0.25 | H | 1 | Good |
| 7 | Irgacure ® 819 | 2 | 0.75 | H | 1 | Fair |
| 8 | Irgacure ® 819 | 2 | 1.5 | D | 2 | Fair |
| 9 | Irgacure ® 907 | 2 | 0.25 | D | 1 | Good |
| 10 | Irgacure ® 907 | 2 | 0.75 | D | 1 | Fair |
| 11 | Irgacure ® 907 | 2 | 1.5 | D | 2 | Fair |
| 12 | Darocur ® 1173 | 1.5 | 0.25 | H | 2 | Fair |

[1]weight percent photoinitiator, based on weight of FP1

Example 2

The UV curing of diacrylated fluoropolymer FP2 to form crosslinked fluoropolymer networks was carried out using an F 300S/F 300SQ UV machine (Fusion UV System Inc., USA). Conditions employed were: UV range of 200-600 nm and power of 700 W, equipped with conveyor belt (1 pass=1.1 sec.).

Curable compositions containing FP2 and photoinitiator were made by mixing the diacrylated fluoropolymer and photoinitiator were made by mixing the diacrylated fluoropolymer and pho- II are data on the swelling (percent weight change) of crosslinked films in octane. The swelling test method employed was to immerse a crosslinked film sample of 1 cm$^2$ surface area and 2 mm thickness into 10 ml of octane. Films were immersed at the temperatures indicated and for the times specified in Table II. Percent weight (wt.) change was defined as $100(m1-m2)/m2$ where m1 and m2 refer to the wt. of the swollen sample and the wt. of the dry sample, respectively.

TABLE II

| Sample # | Photo-Initiator | Amount Photo-Initiator (wt. %[2]) | Film Thickness (mm) | Number of Passes | Degree of Crosslinking | Swelling in Octane, % wt. change, 25° C., 48 hours | Swelling in Boiling Octane, % wt. change, 48 hours |
|---|---|---|---|---|---|---|---|
| 13 | Darocur ® 1173 | 2 | 0.25 | 15 | Good | 0 | 90 |
| 14 | Irgacure ® 819 | 2 | 0.25 | 35 | Good | −2.1 | −8.4 |
| 15 | Irgacure ® 819 | 2 | 0.75 | 40 | Good | −2.3 | — |
| 16 | Irgacure ® 819 | 2 | 1.5 | 40 | Good | −2.8 | −14.6 |
| 17 | Irgacure ® 819/DVE-3[4], 1/1 (wt.) | 2 | 0.25 | 23 | Good | −3.2 | −20.4 |
| 18 | Irgacure ® 819/DVE-3[4], 1/1 (wt.) | 2 | 0.75 | 23 | Good | −3.8 | — |
| 19 | Irgacure ® 819/DVE-3[3], 1/1 (wt.) | 2 | 1.5 | 23 | Good | −4.2 | −25.5 |

[2]weight percent photoinitiator, based on weight of FP2
[3]tri(ethylene glycol)divinyl ether

What is claimed is:

1. A process for the manufacture of a crosslinked fluoropolymer network, said process comprising:
   A) providing a telechelic diacrylate copolymer of formula $CH_2=CR'COO-(CH_2)_n-R-(CH_2)_n-OOCCR'=CH_2$, wherein R' is H or $-CH_3$, n is 2 or 3 and R is an oligomer having a number average molecular weight of 1000 to 25,000 daltons, said oligomer selected from the group consisting of i) an oligomer comprising copolymerized units of vinylidene fluoride and perfluoro(methyl vinyl ether), ii) an oligomer comprising copolymerized units of vinylidene fluoride and hexafluoropropylene, iii) an oligomer comprising copolymerized units of tetrafluoroethylene and perfluoro(methyl vinyl ether), and iv) an oligomer comprising copolymerized units of tetrafluoroethylene and a hydrocarbon olefin;
   B) mixing said diacrylate copolymer with a source of free radicals selected from the group consisting of photoinitiators and organic peroxides to form a curable composition; and
   C) generating free radicals to form a crosslinked fluoropolymer network.

2. A process of claim 1 wherein said oligomer has a number average molecular weight of 1200 to 12,000 daltons.

3. A process of claim 2 wherein said oligomer has a number average molecular weight of 1500 to 5000 daltons.

4. A process of claim 1 wherein said oligomer comprises copolymerized units selected from the group consisting of i) vinylidene fluoride, tetrafluoroethylene and perfluoro(methyl vinyl ether); ii) tetrafluoroethylene, perfluoro(methyl vinyl ether) and ethylene; iii) vinylidene fluoride, hexafluoropropylene and tetrafluoroethylene; and iv) tetrafluoroethylene, vinylidene fluoride and propylene.

5. A process of claim 1 wherein said source of free radicals is a photoinitiator and free radicals are generated by exposing said curable composition to UV light.

* * * * *